Patented Aug. 3, 1937

2,088,608

UNITED STATES PATENT OFFICE 2,088,608

META - N - ALKYLAMINO PARA ALKOXY PHENYL ARSONIC ACID AND METHOD OF MAKING THE SAME

George W. Raiziss, Le Roy W. Clemence, and Abraham I. Kremens, Philadelphia, Pa., assignors to Abbott Laboratories, North Chicago, Ill., a corporation of Illinois No Drawing. Application January 30, 1933, Serial No. 654,240

10 Claims. (Cl. 260—14)

Our invention relates to a new group of compounds which are especially useful as therapeutic agents, more particularly in the treatment of trypanosomiasis and syphilis, and method of preparing the same.

We have observed that the 3-amino derivative of para-hydroxy-phenyl-arsonic acid generally does not form substitutions in the amino group. The production of such substitution products is desirable in chemotherapy for the preparation of valuable medicinal compounds.

We have found, however, that such substitution in the amino group is possible when the hydroxyl group in the para position to the arsonic acid group has been substituted to form oxy-derivatives.

According to our invention, we convert para-hydroxy-phenyl-arsonic acid to para-alkyloxy-phenyl arsonic acid, then introduce the $NO_2$ group in the 3-position, reduce the $NO_2$ to $NH_2$, and substitute on the $NH_2$ group.

Graphically, the procedure may be represented:

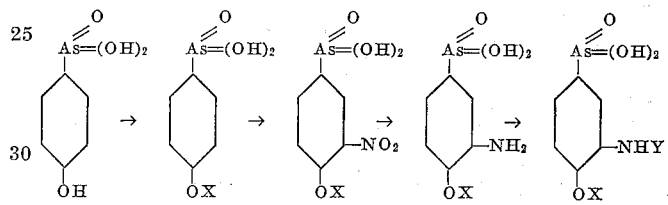

The substituents X and Y are fully described below.

We have developed a method and produced a large number of compounds which represent substitutions in the hydroxyl with the production of methoxy derivatives and higher homologues of this series, such as ethoxy, propyl-oxy, butyl-oxy, etc., carbo-methoxy and homologous derivatives of the same products. By nitration of the above-mentioned compounds and subsequent reduction, we can produce the 3-nitro and 3-amino derivatives of this series of compounds, with the result that a large number of new compounds are formed. We have also prepared 2-nitro, 2-amino and substituted 2-amino derivatives of substituted para-hydroxy-phenyl-arsonic acid. Finally, in conformity with our theory, the 3-amino derivatives of substituted hydroxy-phenyl arsonic acid give substitution products in the amino group, due to the interaction of acyl substances, e. g., chlor-acetyl compounds such as chloracetic acid and substitution products thereof, such as chloracetamide, as well as acetic anhydride, propionic anhydride, and the like. Many of these pentavalent arsenicals of the newly described type can be further reduced so that the arsonic acid group can be changed into the arseno group, which is well-known for its high trypanocidal and spirillicidal effects. Such arseno compounds are valuable in the treatment of trypanosomiasis and syphilis.

The final products contemplated by the present invention would thus have the following general formulas:

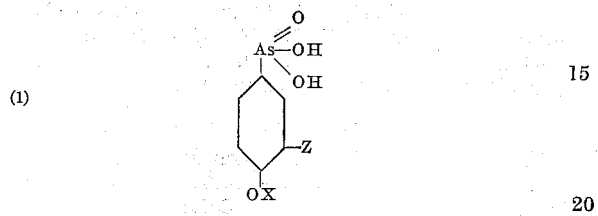

in which X is an alkyl radical such as methyl, forming a methoxy group; ethyl, forming an ethoxy group; and higher homologues and isomers thereof; X may also represent a substituted alkyl radical containing oxygen, nitrogen, etc., such as carbomethyl, forming a carbomethoxy group, carboethyl forming a carboethoxy group, or acetamide and its derivatives, such as acetyl anilide, and higher homologues and isomers. Z represents substituents indicated below.

The nitro derivatives have the following general formula:

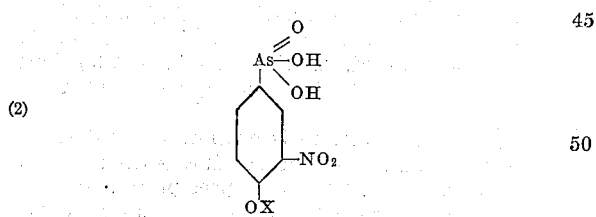

in which X is the same as in Formula (1).

The amino derivatives have the following general formula:

(3) 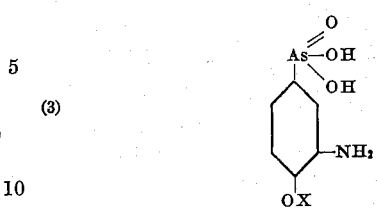

in which X is the same as in Formula (1).

The substituted amino compounds have the following general formula:

(4) 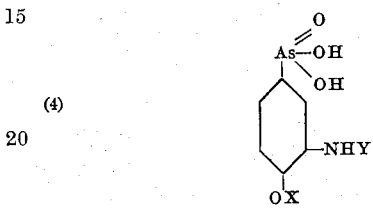

in which X is the same as in Formula (1), and Y is an acyl or a glycyl group, such as (a) an acetyl radical, CH₃—CO—, forming a substituted hydroxy-acetamino-phenyl-arsonic acid,

R(OX)NH—COCH₃, or a homologue thereof such as propionyl, butyryl, etc., R representing the arsonic acid nucleus; (b) a carbomethyl radical —CH₂COOH forming a substituted hydroxy-phenyl-glycine-arsonic acid, R(OX)NH.CH₂.—COOH; (c) —CH₂CONH₂, forming a substituted hydroxy-phenyl-glycine-amide-arsonic acid.

R(OX)NH—CH₂—CONH₂;

(d) —CH₂—CONHC₆H₅, forming a substituted hydroxy-phenyl-glycine-anilide-arsonic acid, R(OX)NH—CH₂—CO—NH—C₆H₅; (e)

—CH₂CONHC₆H₄CH₃, forming a substituted hydroxy-phenyl-glycine-toluidide-arsonic acid,

R(OX)NH—CH₂—CO—NH—C₆H₄—CH₃;

or (f) —CH₂CONHC₆H₄OH, forming a substituted hydroxy-phenyl-glycine-hydroxy-anilide-arsonic acid,

R(OX)NH—CH₂—CO—NH—C₆H₄OH, and their various isomers. Hence, the substituent Y represents the group —CH₂—CO—NH—X, where X represents hydrogen, phenyl, or a substituted phenyl, or an acyl group of general formula —OC—CH₂—R, where R is hydrogen, methyl, or higher alkyl group.

The following examples are illustrative of our invention:

EXAMPLE I

*Alkyl-oxy-phenyl-arsonic acids*
*n-Propyl-oxy-phenyl-arsonic acid*

24 grams of the sodium derivative of para-hydroxy-phenyl-arsonic acid are suspended in a mixture of 150 cc. of methyl alcohol and 25 cc. of water in which 4 grams of sodium hydroxide have been dissolved. To this are added 12.3 grams of n-propyl bromide and the whole refluxed for twenty hours.

The reaction mixture is evaporated to dryness on a steam bath and the residue is dissolved in 50 cc. of water filtered and precipitated by the addition of hydrochloric acid. It may be purified by recrystallization from water or by dissolving in alkali and reprecipitating with hydrochloric acid. The product is para-n-propyl-oxy-phenyl-arsonic acid, and may be represented by the formula:

(5) 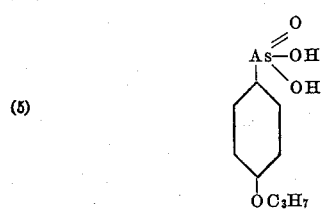

corresponding to the general Formula (1) given above.

The reaction may be represented:

AsH₂O₃—C₆H₄—ONa+C₃H₇Br→
　　　　AsH₂O₃C₆H₄—OC₃H₇+NaBr

From the above, the preparation of the analogous compounds referred to under Formula (1) above will be obvious.

EXAMPLE II

*3-nitro-alkyl-oxy-phenyl-arsonic acids*

The following example of nitration will obviously apply, generally, to the other products referred to above.

13.7 grams of para-n-butyl-oxy-phenyl-arsonic acid, which may be prepared according to method described in Example I are dissolved in 40 cc. of sulphuric acid and cooled to 0°–5° C. and nitrated with a mixture of 4.5 grams of nitric acid and 3 cc. of sulphuric acid allowing the temperature to rise to 15° C. This mixture is added to four volumes of crushed ice with stirring and the precipitated nitro compound is filtered off.

It may be recrystallized from water. The product is 3-nitro-4-n-butyl-oxy-phenyl-arsonic acid, and may be represented by the formula:

(6) 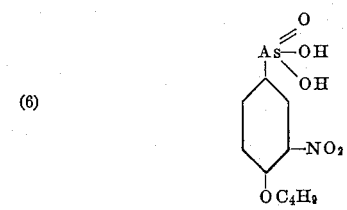

corresponding to general Formula (2) given above.

The reaction may be represented:

AsH₂O₃—C₆H₄—OC₄H₉+HNO₃→
　　　　AsH₂O₃—C₆H₃(OC₄H₉)NO₂+H₂O

EXAMPLE III

*3-amino-alkyl-oxy-phenyl-arsonic acids*

The following is a typical example of reduction to produce the 3-amino compounds:

24 grams of 3-nitro-4-ethoxy-phenyl-arsonic acid, which may be prepared according to method described in Example II, are dissolved in a solution of 20 grams of sodium carbonate in 160 cc. of water. This is added to a suitable reducing agent, preferably an alkaline paste of ferrous hydroxide, which is made as follows:

160 grams of ferrous sulphate are dissolved in 160 cc. of water and to this is added with stirring a solution of 120 grams of sodium hydroxide. The material is cooled to 30° C. before adding to it the solution of the nitro compound.

Other reducing agents, such as sodium hydrosulphite, may be used.

After the nitro compound has been added to the reducing agent it is stirred for one hour and then filtered. Hydrochloric acid is added to this solution until just acid to congo.

The amino compound crystallizes and is filtered off.

It may be recrystallized from water. The product is 3-amino-4-ethoxy-phenyl-arsonic acid and may be represented by the formula:

(7) 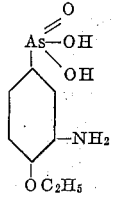

corresponding to general Formula (3) given above.

The reaction may be represented:

$AsH_2O_3 \cdot C_6H_3(OC_2H_5)NO_2 + 6Fe(OH)_2 + 4H_2O \rightarrow$
$AsH_2O_3 - C_6H_3(OC_2H_5)NH_2 + 6Fe(OH)_3$

Example IV

*3-acetyl-amino-4-ethoxy-phenyl arsonic acid*

36 grams of 3-nitro-4-ethoxy-phenyl arsonic acid, which may be prepared according to method described in Example II are dissolved in a solution of 30 grams of sodium carbonate in 240 cc. of water. This is added to suitable reducing agent such as an alkaline paste of ferrous hydroxide, which is made by dissolving 240 grams of ferrous sulphate in 240 cc. of water and to this is added with stirring a solution of 180 grams of sodium hydroxide. The material is cooled to 30° before adding to it the solution of the nitro compound. After the nitro compound is added it is stirred for one hour and filtered. Hydrochloric acid is added until neutral to litmus, and then add 25 cc. of acetic anhydride, and stir well. A precipitate separates. Filter this and recrystallize from water. It crystallizes in fine needles. The product is 3-acetyl-amino-4-ethoxy phenyl arsonic acid and may be represented by the following formula:

(8) 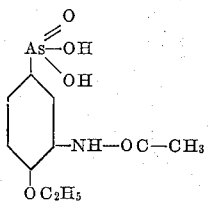

In the above manner the higher homologs of the acetyl group can also be introduced such as propionyl, butyryl, etc. Derivatives of propyloxy-, butyl-oxy-, etc. -arsonic acids can also be prepared by similar procedure.

Example V

*4-isoamyloxy-1-arsonic acid-phenyl-3-glycine anilide*

30 grams of 3-amino-4-iso-amyl-oxy-phenyl-arsonic acid, which may be prepared according to the method described in Example III are dissolved in a solution of 4 grams of sodium hydroxide in 100 cc. of water.

After adding 17 grams of chloracetanilide the mixture is refluxed for four hours, filtered and acidified with hydrochloric acid.

The 4-isoamyloxy-1-arsonic acid-phenyl-3-glycine-anilide is precipitated. It may be purified by dissolving it in dilute ammonium hydroxide, treating with charcoal, filtering and reprecipitating with dilute hydrochloric acid. It may be represented by the formula:

(9) 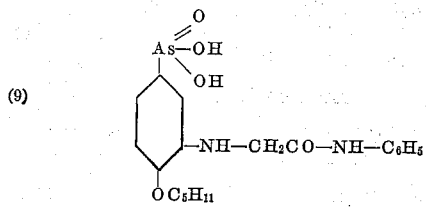

corresponding to general Formula (4) given above.

The reaction may be represented:

$AsH_2O_3 - C_6H_3 - (OC_5H_{11})NH_2 + Cl - CH_2 -$
$CO - NH - C_6H_5 \rightarrow AsH_2O_3 - C_6H_3(OC_5H_{11}) -$
$NH - CH_2 - CO - NH - C_6H_5 + HCl$ 3-amino-4-carbomethoxy-phenyl arsonic acid cannot be isolated by reduction of the corresponding nitro derivative because a molecule of water is eliminated with the formation of 3-hydroxy-1-4-benzisoxazine-6-arsonic acid which does not react with chloracetyl compounds to form a substituted amino derivative.

However, if the alkaline solution from the reduction of the 3-nitro-4-carbomethoxy-phenyl-arsonic acid with the reducing agent, as described in Example III, is not acidified, the 3-amino-4-carbomethoxy-phenyl-arsonic acid remains as such in solution and can then be condensed with an acyl compound, such as

where R is hydrogen or a phenyl group, to form glycine derivatives, such as 2-carbomethoxy-5-arsonic acid and phenyl-glycine-amide, or other glycine derivatives.

Example VI

*N(2-carboxy-methoxy-5-arsonic acid-phenyl)-glycine-amide*

51.2 grams of 3-nitro-4-carboxymethoxy-phenyl arsonic acid are dissolved in a solution of 40 grams of sodium carbonate in 320 cc. of water. This is added gradually with stirring to a ferrous hydroxide paste made by mixing together 320 grams of ferrous sulphate in 320 cc. of water and 240 grams of sodium hydroxide in 320 cc. of water.

After stirring for one hour the mixture is filtered, the clear filtrate is acidified until it is just neutral to litmus, and 6.4 grams of sodium hydroxide quickly added.

To this are added 30 grams of chloracetamide and refluxed for three hours. The mixture is cooled and acidified to congo with hydrochloric acid, precipitating the 4-carboxy-methoxy-1-arsonic acid-phenyl-3-glycine-amide. This compound may be purified by dissolving it in dilute ammonium hydroxide, treating with some charcoal, filtering and precipitating with dilute hydrochloric acid. It may be represented by the general Formula (4) given above, and specifically:

(10) 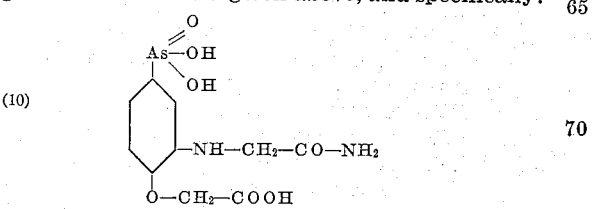

While the substituted amino derivatives of carbo-methoxy-phenyl-arsonic acid must be prepared by this method for reasons explained above, we prefer to use this method also for the preparation of substituted amino derivatives of other members of this series because it eliminates the isolation of the intermediate amino compound.

EXAMPLE VII

*Derivatives of 1-arsonic acid-phenyl-4-oxy acetyl-anilide*

A compound of the type described in general Formula (1) which contains nitrogen in the substituted alkyl radical would be derivatives of 1-arsonic acid-phenyl-4-oxy acetyl-anilide, having the structural formula:

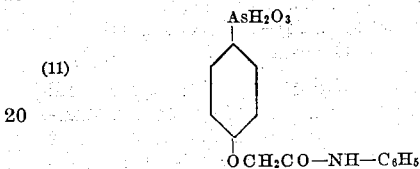

This compound is known and has been previously prepared. However, the nitro and amino or substituted amino derivatives of this compound have not been previously described.

The nitro compound is prepared as follows:

14.04 grams of 1-arsonic acid-phenyl-4-oxy acetyl-anilide were dissolved in 42 cc. of sulphuric acid and cooled to 0° C. and nitrated with a mixture of 3.6 grams of nitric acid and 2.5 cc. of sulphuric acid, allowing the temperature to rise to 15° C. This mixture was added to four volumes of crushed ice with stirring and filtered off. It is purified by solution in dilute ammonium hydroxide, treatment with a small quantity of decolorizing carbon such as "nuchar" and reprecipitation with hydrochloric acid. The product is 3-nitro-1-arsonic acid 4-phenoxy acetyl anilide and may be represented by the formula:

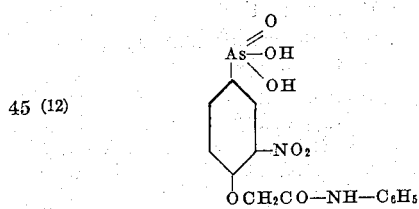

The amino compound is formed by reduction of the above nitro compound as follows:

16 grams of 3-nitro-1-arsonic acid 4-phenoxy acetyl-anilide are dissolved in a solution of 10 grams $Na_2CO_3$ in 80 cc. of $H_2O$. This is added to an alkaline ferrous hydroxide paste which is made as follows: 80 grams of ferrous sulphate are dissolved in 80 cc. $H_2O$ and to this is added with stirring a solution of 60 grams NaOH in 80 cc. $H_2O$. This is cooled to 20° C. before adding to it the solution of the nitro compound.

This addition is made with stirring and allowing the mixture to react for one hour. It is then filtered, the precipitate washed thoroughly and the combined filtrates neutralized to Congo red with hydrochloric acid. The amino compound is filtered off and purified by solution in dilute ammonium hydroxide and reprecipitation with hydrochloric acid. The compound is 3-amino-1-arsonic acid phenyl-4-oxy acetyl anilide and has this formula:

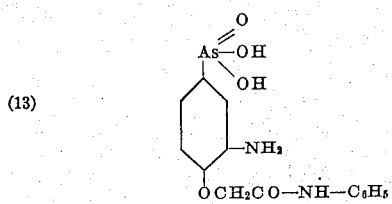

The acetyl derivative of this compound having the formula:

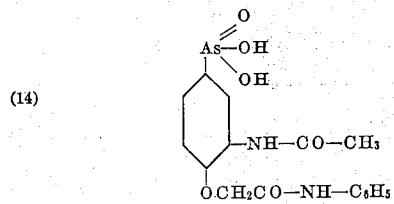

has been prepared by us.

The pentavalent arsenicals produced according to above-mentioned reactions may be further reduced so that the arsonic acid group is changed to an arseno group.

EXAMPLE VIII

*-4,4'-carboxymethoxy-3,3'-N-(glycine-para-hydroxy-anilide)-arseno-benzene*

Four grams of -N(2-carboxymethoxy-5-arsonic acid-phenyl) glycine-para-hydroxy-anilide are dissolved in 20 cc. of water with the aid of two molecules of sodium hydroxide. This solution is cooled and added slowly to a cooled solution of four grams of magnesium chloride and twenty-five grams of sodium hydrosulphite in 100 cc. of water.

The mixture is filtered and warmed with continuous stirring for one hour at 55° C. The arseno compound separates as a light yellow precipitate which is 4,4'-carbomethoxy-3,3'-glycine-para-hydroxy-anilide-arseno-benzene and may be represented by the formula:

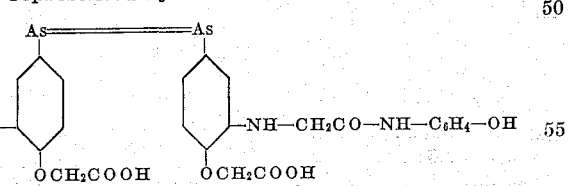

In the same manner we have reduced to corresponding arseno derivatives the following arsonic acid compounds:

N-(2-carboxymethoxy-5-arsonic acid-phenyl) glycyl-anilide 3-acetamino-1-arsonic acid-4-phenoxy acetic acid N(phenyl-4-carboxymethoxy-1-arsonic acid)-3-glycine amide N(2-ethoxy-5-arsonic acid-phenyl)-glycine-anilide N(2-carboxymethoxy-5-arsonic acid-phenyl)-glycine-4'-toluidide as well as other arsonic acid derivatives mentioned in this specification.

*Salts*

All of the compounds described above react with alkali metal and alkaline earth bases to give salts.

It will be understood that we have given above only certain preferred embodiments of our invention as examples, and that various other embodiments, as well as modifications, variations, and improvements coming within the spirit of our invention will probably suggest themselves to those skilled in the art. Hence, we do not wish to be restricted to the above examples or uses mentioned, except to the extent indicated in the appended claims, which are to be interpreted as broadly as the state of the art will permit.

We claim as our invention:

1. A compound having the following formula—

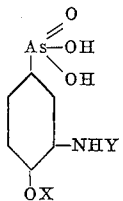

wherein X is an alkyl group higher than methyl and Y is an acyl group.

2. A method of forming an amino substitution derivative of 3-amino-para-hydroxy-phenyl-arsonic acid, comprising substituting an alkyl residue in the hydroxy group of para-hydroxy-phenyl-arsonic acid to form a para-alkyloxy-phenyl-arsonic acid, nitrating the latter to form a 3-nitro-para-alkyl-oxy-phenyl arsonic acid, reducing the latter to form a 3-amino-alkyloxy-phenyl-arsonic acid, and reacting upon the latter compound with a compound containing an acyl group to produce a compound having the formula

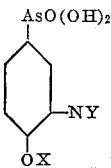

where X is an alkyl higher than methyl or a substituted alkyl radical, and Y is an acyl group.

3. A method of forming an amino substitution derivative of 3-amino-para-hydroxy-phenyl-arsonic acid, comprising forming first an alkyloxy substitution product of para-hydroxy-phenyl-arsonic acid by treatment of the latter with an alkyl halide, nitrating said substitution product to introduce $NO_2$ into the 3-position and reducing the nitro compound to the amino compound, and then condensing the amino compound with an acyl compound or a compound having the formula

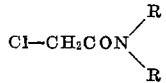

where R is hydrogen or a phenyl group.

4. A method comprising substituting an alkyl group in the hydroxyl group of para-hydroxy-phenyl-arsonic acid, nitrating to form a 3-nitro-para-alkyloxy-phenyl-arsonic acid, reducing the latter, and treating the 3-amino compound thus obtained to produce a compound having the formula

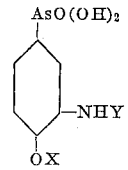

wherein X is an alkyl radical, and Y is an acyl group.

5. A compound having the following formula—

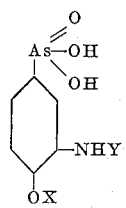

wherein X is an alkyl radical higher than methyl and Y is a member of the class consisting of the acetyl group and homologues thereof.

6. A method comprising substituting an alkyl group in the hydroxyl group of para-hydroxy-phenyl-arsonic acid, nitrating to form a 3-nitro-para-alkyloxy-phenyl-arsonic acid, reducing the latter, and treating the 3-amino compound thus obtained to produce a compound having the formula

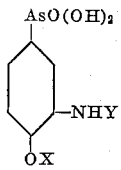

wherein X is an alkyl radical, and Y is a member of the class consisting of the acetyl group and homologs thereof.

7. A phenyl arsonic acid prepared according to the process described in claim 2.

8. A phenyl arsonic acid prepared according to the process described in claim 3.

9. A phenyl arsonic acid prepared according to the process described in claim 4.

10. A phenyl arsonic acid prepared according to the process described in claim 6.

GEORGE W. RAIZISS.
LE ROY W. CLEMENCE.
ABRAHAM I. KREMENS.